Aug. 29, 1933.  T. W. STONE  1,924,468
METHOD OF AND APPARATUS FOR MEASURING GASES
Filed June 20, 1927
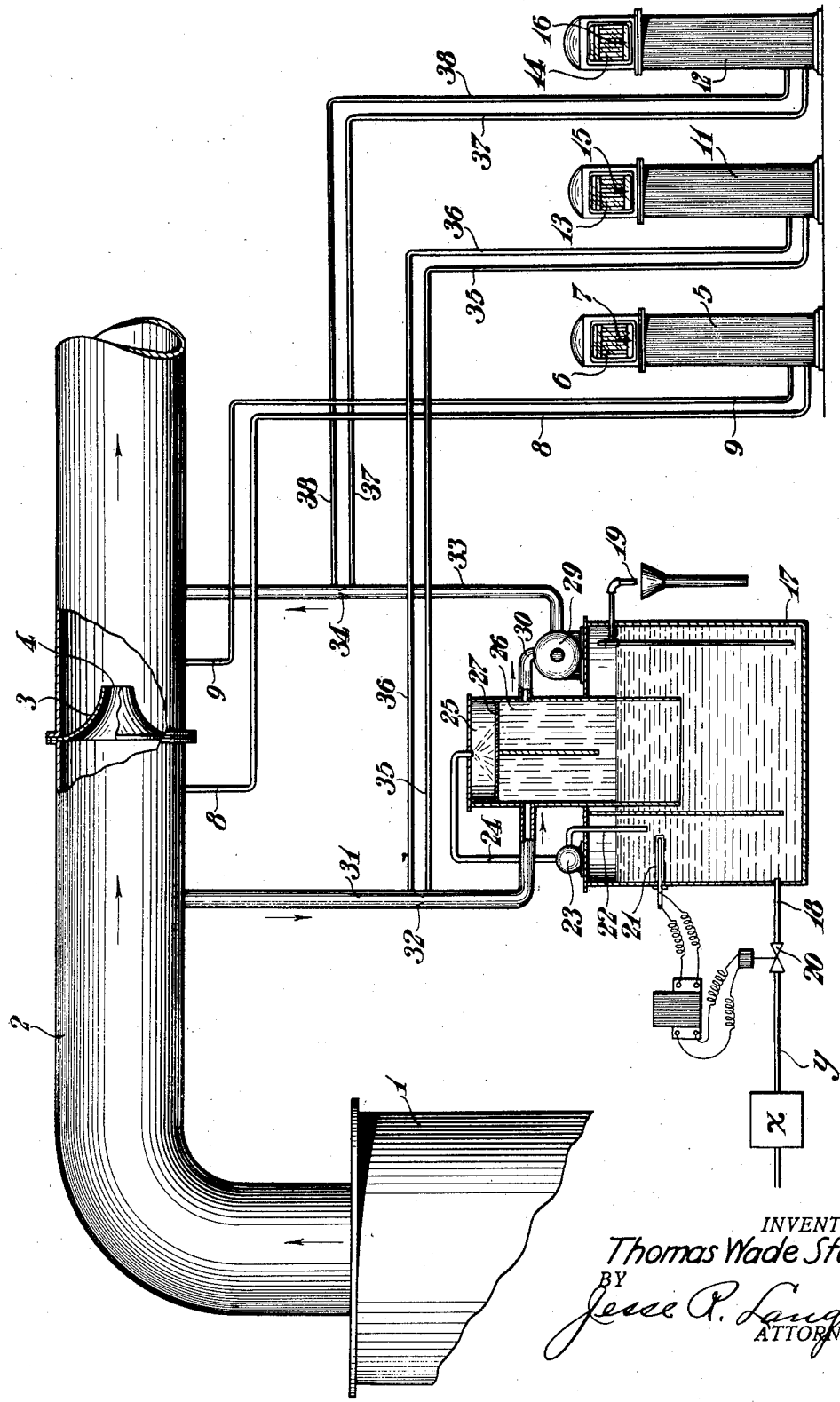
INVENTOR.
Thomas Wade Stone
BY
Jesse R. Langley
ATTORNEY.

Patented Aug. 29, 1933

1,924,468

UNITED STATES PATENT OFFICE 1,924,468

METHOD OF AND APPARATUS FOR MEASURING GASES

Thomas Wade Stone, Fort Wayne, Ind., assignor to The Western Gas Construction Company, a Corporation of Indiana Application June 20, 1927. Serial No. 200,254

11 Claims. (Cl. 23—255)

This invention relates to a method of and apparatus for measuring gases, particularly fuel gases such as producer gas, water gas and the like.

An object of my invention is to provide simple and reliable means for measuring the effective quantity of gas contained in raw gas of several constituents in various quantities.

A further object of my invention is to provide means whereby the operating efficiency of a water-gas machine or the like may be determined.

A still further object of my invention is to provide means for determining, at any desired instant, the percentage of standard or effective gas being generated by a water-gas machine or the like.

In plants where several water-gas machines or sets are installed, the raw gas from a number of machines is delivered into a common relief holder. At the present time, this raw gas cannot be successfully measured. It passes from the gas-making machine or set at a temperature usually between 175° to 190° F., as a mixture of gas, oil vapors, water vapor and entrained water, the raw gas being saturated or nearly saturated with oil and water vapors. Its composition varies frequently, so that the off-take raw gas passing from one water-gas machine to the relief holder may be quite different from the off-take gas from another machine. Very slight variations in the composition of the mixture make a very great difference in the percentage of "standard gas" or "corrected gas", as is the more proper designation. By "standard" or "corrected gas" is meant 1000 cubic feet of gas in the state and composition in which it will be when cooled to 60° F., by passing through a spray of water and at a pressure of 30 inches of mercury.

Attempts have been made to measure the raw off-take gas by placing an orifice in the off-take pipe of individual machines and connected with a suitable orifice meter, such arrangement serving fairly well to indicate the flow of corrected gas only when the raw gas being measured is in a fairly constant condition and its composition is somewhat near the state of corrected gas. The readings on such meters of raw mixtures are entirely inadequate to give any practical and useful idea of the rate at which corrected gas is passing from the machine, since the percentage of corrected gas is not known.

Should the operator, for example, decide to change the amount of steam admitted to the machine or the generator of the set, from say, 210 lbs. per minute to a rate of 240 lbs. per minute, there would of course be an increased flow and pressure throughout the water-gas set or machine with a corresponding increase in gaseous products, but whether or not more gas was actually being made after the change in steam admitted than before, has heretofore been unknown. The orifice meters or other apparatus available heretofore have been incapable of determining the actual results. Only the approximate performance of a group of machines for an operating period of a day or an hour has heretofore been determined, but such periods, whether relatively long or short, are nevertheless of longer duration than are the cycles of changing conditions inside the machine or set. Therefore, a favorable or an unfavorable condition may arise and pass before it may be detected in the shortest period for which a reading may be taken on an orifice meter or any other apparatus heretofore available.

Thus the operator has no definite means of testing and correcting the operation of his machine to produce a uniform and better flow of gas. He has been seriously handicapped in all attempts, heretofore, to determine the point of highest efficiency at which to operate a water-gas set or machine, and this applies to the various machines in present use, since there has not existed, prior to the present invention, any known method or apparatus by which the amount of "corrected" gas coming through the off-take of the machine or set may be accurately determined.

I have discovered a method by which this measurement may be accomplished successfully and all of the difficulties above noted may be entirely overcome.

In the accompanying drawing, the single figure is a diagrammatic view of apparatus illustrating a preferred form of my invention.

My invention consists in the various steps described and hereinafter set forth in the appended claims, and in apparatus adapted for carrying out said method, as broadly set forth in the claims.

In the drawing, 1 indicates a tar-batter or wash box of any water-gas set or machine from which, through a suitable off-take pipe line 2, the raw gas leaves the machine and is conveyed to a relief holder, not shown, which will usually be at a distance from the water-gas house. The conduit pipes in line 2 are usually 30" to 36" in diameter, the direction of flow of raw gas being indicated by an arrow.

Within the pipe 2, I install any suitable restricting device 3, having an orifice or outlet 4 of desirable diameter and adapted to co-operate with an orifice meter 5 having a suitable chart 6 and an indicator or pointer 7. Any of a number of standard commercial orifice meters may be used. From the meter 5, pressure lines 8 and 9 are suitably connected to the pipe 2, one on each side of the orifice 4.

In the practice of my method, I use two other orifice meters, 11 and 12, having similar charts 13 and 14 and pointers 15 and 16, respectively. The pointer 7 will show the amount of mixture or raw gas flowing through the orifice 4 at any particular instant during the period of operation of the set. The functions of the meters 11 and 12 will be hereinafter stated; it being understood that the recording on the charts 6, 13 and 14 of the meters 5, 11 and 12, respectively, is synchronized as to time, and the charts are calibrated to show the flow corresponding to the various positions of the indicators.

In the new method herein disclosed, I use any suitable form of chamber provided with a curtain or spray of water maintained at a constant temperature and, by means of a suitable suction pump, I pass the raw gas through the water spray, whereby it is corrected in temperature, composition and pressure, and I then return the now corrected gas to the pipe line.

Such apparatus is indicated by a tank 17 and associated parts. An inert cooling liquid such as cold water is supplied to tank 17 from a water inlet pipe 18, the overflow therefrom being indicated at 19. The inlet 18 is provided with a thermostatically controlled regulating valve 20. The valve 20 is opened or closed by the temperature of a thermostatic element 21 located in the water in the tank 17 near the suction inlet pipe 22. A suction pump 23 draws the water from the tank and discharges it through a pipe 24 into a top compartment 25 of a spray chamber or scrubber 26 of tank 17. Within the spray chamber 26, suitable provision is made for spraying the water, as by a perforated floor 27, so that the water will fall like a rain shower down through the chamber 26 and return to the tank 17. Thus the temperature of the water drawn by the pump 23, as well as the temperature of the compartment through which it falls, is maintained at a constant temperature of 60° F.

X indicates conventionally any means for maintaining at a given or standard pressure the water in the water feed-line $y$ leading to the thermostatically operated valve 20, and the head of water in the tank 17 is controlled by the siphonic overflow 19.

I provide also an exhaust pump 29, the inlet to which is connected by a pipe line 30 to one side of the water spray compartment 26, the opposite side of compartment 26 being connected by a pressure line 31 to raw gas pipe line 2 at a point between the point of attachment of line 8 thereto and the tar-batter 1. Within this pressure line 31 is an orificed member 32. The discharge side of the exhaust pump 29 is provided with a pressure line 33, which discharges into the pipe line 2 at a point beyond the point of attachment of line 9 thereto. Within this pressure line 33 is an orificed member 34. It will thus be understood that gas is exhausted by pump 29, from the line 2, through line 31, orifice member 32, the water compartment 26 and line 30, and is discharged by the pump 29 through line 33 and orifice 34 into line 2.

The pressure within the water compartment 26 may, if desired, be maintained constant by any of several suitable or usual well known means (not shown) for this purpose. For example, a usual device comprises a pressure regulator of the diaphragm type for controlling an inlet valve to the enclosure within which the pressure is controlled. Or, such regulator may control the speed of an exhaust pump connected to the enclosure. However, in the operation of the apparatus of the present invention such refinement is not necessary as the percentage of error due to fluctuations in pressure is so small as to be negligible for the purposes for which the apparatus is intended.

The pump 29 is operated at substantially constant speed and at such rate as to provide an average pressure corresponding substantially to 30 inches of mercury or its approximate equivalent, atmospheric pressure.

The orifice meter 11 is suitably connected by pressure lines 35 and 36 with the pressure line 31 at either side of the orifice member 32.

The orifice meter 12 is suitably connected, similarly, by pressure lines 37 and 38 to the return line 33, at either side of orifice member 34.

It will be understood that only the "corrected" gas content of the sample raw gas passing through orifice member 32 will be returned to the line 2 through orifice member 34 and hence be registered by meters 11 and 12. It will also be understood that the ratio of reading on meter 12 to the reading on meter 11 will give, instantaneously, the factor of percentage of correction to the water-gas machine or set, required to produce the exact amount of "corrected gas" which is to pass away from the machine through orifice 4 and to be indicated on chart 6 of the meter 5.

By measuring the total quantity of raw gas that passes through the off-take of the water-gas machine or set, and by observing the proportion of corrected gas in a given sample, I am enabled to determine the total quantity of "corrected" gas being produced at any time in the operation of the set. Since the charts 6, 13 and 14 on meters 5, 11 and 12, respectively, are all recording and their records are synchronized as to time, any reading on meter 5 has corresponding instantaneous readings on meters 11 and 12, so that the exact corrected rate of flow, at any and all times, can be immediately determined. This will enable the operator to know immediately the effective gas production from the generator of the water-gas machine or set, and to determine what, if any change, may be required, and to make such change at once.

For example, an increase in the amount of steam admitted to the generator of the set would show, on meter 5, an increased flow and pressure of gaseous products throughout the set, (which heretofore would not indicate whether or not more gas was actually being produced), but, if this increased flow reading on meter 5 should be accompanied, in my apparatus and by my method, by a decrease in the indicated ratio of the readings on meter 12 to meter 11, it would thus be evident that a condition of maximum efficiency in the machine or set had been over-reached. If, however, the ratio of indicated readings of meters 12 to 11, under like circumstances, should show an increase, it would indicate immediately to the operator that while conditions had improved, the amount of steam supplied to the machine might probably be still further increased with an increase in efficiency.

The successful operation of applicant's invention is dependent upon the relative drops in pressure at the orifices measured by the meters 11 and 12 and not the absolute drops in pressure at these orifices. The relative drops in pressure are only very slightly affected by variations in barometric pressure.

If desired, the readings of the several meters or the results computed from the readings may be corrected for the average barometric pressure during the period covered by the meter readings but such accuracy is usually not necessary as the error from such variations is very small.

I have shown in the diagrammatic view the use of three separate meters 5, 11 and 12, but it will be at once apparent that the functions of these meters may be performed by a single metering device, wherein the three orifice meter mechanisms will function as described, their variable factors will be reduced to a resultant and a single chart will exhibit to view a reading of the volume of flow of corrected gas, only, and whereby the differential pressures found from time to time about the orificed members 3 and 32 will automatically actuate metering mechanism within such device in such manner as to instantly make the required corrections. Such apparatus will be equally adapted to the carrying out of my novel method of measuring gases as are the three separate meters indicated, since my invention embraces any means for measuring the total flow of raw gases passing from the water-gas machine or set, and, by the method above described and with the use of any suitable apparatus, by observing the proportion of corrected gas in a sample taken, thereby determining the total quantity of "corrected" gas; and then correcting the operation of the water-gas set or machine accordingly.

The utility of this method in the practical operation of one or more water-gas sets is very pronounced, as by my method I am enabled to obtain the maximum of thermal efficiency and thereby greatly increase the quantity of "corrected" gas from a given installation.

I claim as my invention:

1. The method of testing gases which comprises measuring the rate of flow of the raw gas from the take-off of a water-gas machine or the like, passing a sample of raw gas through a correcting bath of cold fluid maintained at a constant given temperature at a standard pressure, measuring the rate of flow of this sample before as well as after correction to determine the ratio of corrected gas to raw gas, and applying this ratio to the rate of flow of the raw gas from said takeoff.

2. The method of testing gas which comprises the steps of measuring the amount of raw gas passing through the take-off conduit of a water-gas machine or the like by means of a metering device associated with the take-off conduit, passing a sample of raw gas through cold liquid at a constant, given temperature at a standard pressure whereby the gas is corrected in temperature, composition and pressure, passing the sample of raw gas through a separate metering device before it reaches the liquid and passing the corrected gas of the sample through a third metering device.

3. The method of testing gas which comprises the steps of measuring the amount of raw gas passing through the take-off conduit of gas-making apparatus by means of an orifice meter operatively connected therewith, passing a sample of said raw gas through a spray of cold liquid maintained at a constant given temperature at a standard pressure, whereby said raw gas sample is corrected as to temperature, composition and pressure, and in passing said sample through an orifice metering device both before and after passing it through the cold liquid spray.

4. In apparatus for testing gas in combination, means for metering the rate of flow of a sample of the raw gas from the take-off of a water-gas machine or set, a bath compartment containing cold liquid maintained at a constant temperature at a standard pressure, means for passing said sample of raw gas through the cold liquid bath and a device for measuring the rate of flow of said sample both before and after passing through the cold water bath.

5. Apparatus for measuring raw gases comprising a take-off conduit of a water-gas machine or set, orifice metering means associated therewith, a cold water tank having a spraying compartment, means for maintaining a constant temperature at a standard pressure of the water in said tank, means for circulating the water through the spraying compartment, a second orifice metering device, means for exhausting a sample of raw gas from the take-off conduit through said second metering device and then through the spraying compartment, and orifice means for measuring the gas after passing through the spraying compartment.

6. In apparatus of the character described, in combination with a conduit, an orificed member in said conduit, a scrubbing chamber, pipes extending to said scrubbing chamber from said conduit at the respective sides of said orificed member, an orificed member in each of said pipes, and a flow meter associated with each of the three orificed members.

7. In apparatus of the character described, in combination with a conduit, an orificed member in said conduit, a scrubbing chamber, pipes extending to said scrubbing chamber from said conduit at the respective sides of said orificed member, an orificed member in each of said pipes, and a flow meter associated with each of the three orificed members, each of said flow meters having pipes connected at each side of the associated orificed member and closely adjacent thereto.

8. In apparatus of the character described, in combination with a conduit, an orificed member in said conduit, a tank, a pipe supplying an inert cooling liquid to said tank, a valve in said pipe, a thermostat in said tank for controlling said valve, bypass pipes connecting said tank with said conduit at the respective sides of said orificed member, an orificed member in each of said bypass pipes, and a flow meter associated with each of the three orificed members.

9. In apparatus of the character described, in combination with a conduit, an orificed member in said conduit, a tank, an inert cooling liquid in said tank, means for maintaining a local recirculation of said cooling liquid between different portions of said tank, bypass pipes connecting said tank with said conduit at the respective sides of said orificed member, an orificed member in each of said bypass pipes, and a flow meter associated with each of the three orificed members.

10. The method of testing gases which comprises continuously passing the gases through a main flow meter, and simultaneously by-passing a sample of said gas around said flow meter, passing said by-passed sample through an inert scrubbing liquid, thereby maintaining said sample at a constant given temperature at a standard pressure, and passing said by-passed sample before and after the scrubbing operation through secondary flow meters, whereby the reading of said main flow meter may be corrected in proportion to the differential of said secondary flow meters.

11. The method of determining a corrected rate of gas flow through a conduit, which comprises measuring the rate of flow of raw gas through said conduit, taking off a continuous sample of said raw gas, passing said sample through an inert scrubbing liquid, thereby maintaining said sample at a constant given temperature at a standard pressure, and measuring the rate of flow of said sample before and after it is passed through said scrubbing liquid, and thereby obtaining a correction factor applicable to the measurement of gas flow through said conduit.

THOMAS WADE STONE.